Aug. 4, 1931.　　　　　W. E. KEE　　　　　1,817,826
METHOD OF MAKING GOBLETS AND SIMILAR ARTICLES
Filed April 17, 1930
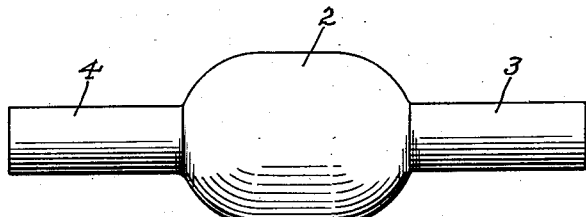
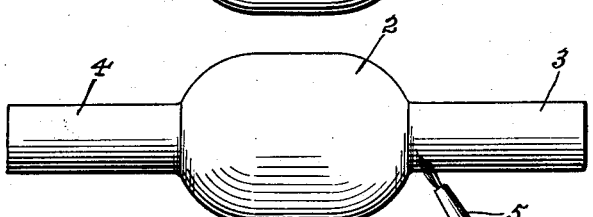
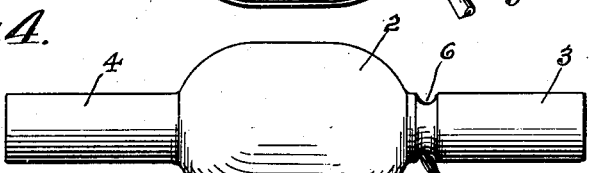
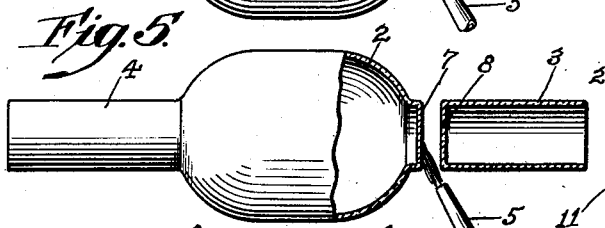
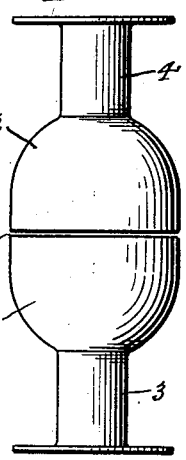
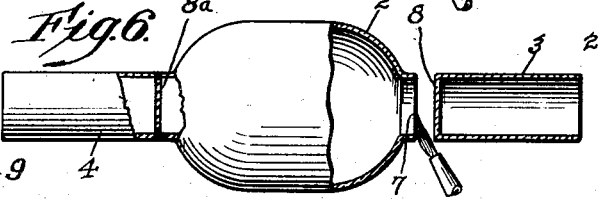
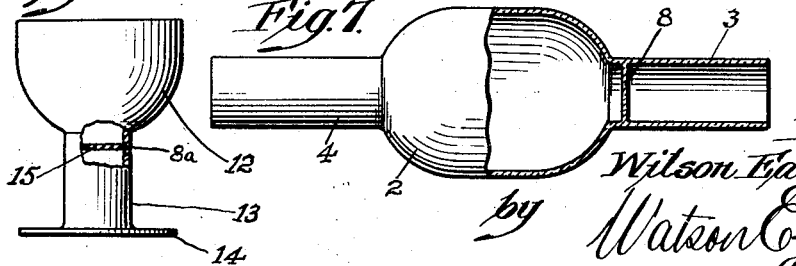
Inventor
Wilson Earl Kee
by Watson E. Coleman
Attorney Patented Aug. 4, 1931

1,817,826

UNITED STATES PATENT OFFICE

WILSON EARL KEE, OF PHILADELPHIA, PENNSYLVANIA

METHOD OF MAKING GOBLETS AND SIMILAR ARTICLES

Application filed April 17, 1930. Serial No. 445,054.

This invention relates to the method of making goblets from glass tubes, and has for one of its objects to improve this method to the end that two goblets may be made from a single glass tube in a comparatively easy manner and in a comparatively short time.

The method is hereinafter fully described and claimed, and illustrated in the accompanying drawings, wherein:—

Figure 1 is a view in side elevation of the glass tube from which the goblets are made;

Figures 2 to 9 are views illustrating the several stages through which the tube passes during the practice of the method, and Figure 10 is a view partly in elevation and partly in section of one of the goblets.

In practicing the method, the glass tube 1, which is shown in Figure 1 and is of such length and diameter as to permit two goblets to be made therefrom, has its central portion heated to reduce it to a molten state. The tube 1 is then blown to expand its central portion into substantially globular formation, as shown at 2 in Figure 2. The bowls of the goblets are made from the globular portion 2, and the stems and bases of the goblets are made from the remaining portions 3 and 4 of the tube.

The tubular portion 3 is heated at a point close to the globular portion 2 by means of an oxy-acetylene or other suitable torch 5 which is so supported as to direct its flame against the tubular portion at an angle to its axis and inclined in the direction of the globular portion. The tubular portion 3, together with the globular portion 2 and tubular portion 4, is turned about its axis to effect the melting of an annular strip thereof by the flame of the torch 5, as indicated at 6 in Figure 4. The tubular portion 3 is, at the same time, subjected to a force acting in the direction of its axis and away from the globular portion 2 to place the annular strip 6 under transverse tension. As the flame of the torch 5 is directed against the annular strip 6 at an angle to the axis of the strip, and in view of the transverse tension to which it is subjected, the strip will be folded upon itself and in the direction of the axis of the tubular portion 3, until the folds of the strip extend across the tubular portion and are separated, with the result that the tubular portion is provided with transverse walls 7 and 8, as shown in Figure 5.

The formation of the walls 7 and 8 separates the greater part of the tubular portion 3 from the globular portion 2, and immediately after this separation takes place, the tubular portion is relieved of all longitudinal stress. The torch 5 continues to direct its flame against the wall 7 in close proximity to the wall 8, with the result that the wall 7 is melted out, as shown in Figure 6, and the wall 8 is maintained in a molten condition.

After the wall 7 has been melted out, the greater part of the tubular portion 3 is moved in the direction of its lesser part and fused thereto, as shown in Figure 7, with the result that the wall 8 extends across and closes the tubular portion in close proximity to the globular portion 2.

The tubular portion 4 is similarly treated to provide it with a wall 8ª which extends across and closes it close to the globular portion 2. The outer ends of the tubular portions 3 and 4 are then heated and flanged outwardly, as indicated at 9 and 10, respectively, in Figure 8. The globular portion 2 is now separated centrally between the tubular portions 3 and 4, as indicated at 11 in Figure 9 to provide two similar goblets. The globular portion 2 may be separated by a diamond or any other suitable means.

One of the goblets is shown in Figure 10 and from the foregoing, it will be understood that its bowl 12 is made from one-half of the globular portion 2, that its stem 13 and base 14 are made from one of the tubular portions 3 and 4, and that one of the partitions 8 and 8ª constitutes the bottom 15 of the bowl. It will be further understood that the manner in which the tubular portions 3 and 4 are provided with the walls 8 to effect the closing of the ends of the globular portion 2, and thus provide bottoms for the bowls made of the globular portion, enables two goblets to be formed from a single glass tube in a comparatively easy manner and in a comparatively short time. It is to be understood that this method may be employed for making glass articles other than goblets and embodying a bowl, stem and base, and that one of the characteristic features of the method is the step by which the bowl is closed.

I claim:—

1. The herein described method of making a goblet, consisting in laterally enlarging a portion of a glass tube to provide a bowl and stem, in forming a wall across that end of the stem near the bowl to provide a bottom for the bowl, and in flanging the other end of the stem outwardly to provide a base.

2. The herein described method of making a goblet, consisting in laterally enlarging a portion of a glass tube to provide a bowl and stem, in melting an annular portion of the stem near the bowl, in forcing such portion inwardly and subjecting it to a transverse strain to separate the stem from the bowl and to provide walls closing the bowl and stem, in removing one of said walls, in fusing the stem and its wall to the bowl to close the bottom of the bowl, and in flanging the stem outwardly to provide a base.

3. The herein described method of making a goblet, consisting in laterally enlarging a portion of a glass tube to provide a bowl and stem, in directing a flame against an annular portion of the stem near the bowl and subjecting such portion to an inward pressure through the medium of the flame and a transverse strain through the medium of a force acting longitudinally of the stem and in a direction away from the bowl, to separate the stem from the bowl and provide walls closing the bowl and stem, in melting out the wall of the bowl through the medium of the flame, in fusing the stem and its wall to the bowl, and in flanging the stem outwardly to provide a base.

4. The herein described method of making a goblet consisting in laterally enlarging a portion of a glass tube to provide a bowl and stem, in heating an annular portion of the stem near the bowl and in subjecting such portion to an inward pressure through the medium of the flame directed thereagainst at an angle to its axis and inclined in the direction of the bowl and in subjecting such portion to a transverse strain acting in the direction of the axis of the stem and away from the bowl, to separate the stem from the bowl and provide walls closing the bowl and stem, in melting out the wall of the bowl through the medium of the flame, in fusing the stem and its wall to the bowl, and in flanging the stem outwardly to provide a base.

5. The herein described method of making goblets, consisting in laterally enlarging the central portion of a glass tube to provide a bowl forming portion and stem forming portions, in separating the stem portions from the bowl portions and at the same time forming walls across the stem portions, in fusing the stem portions and the walls to the bowl portion, in flanging the stem portions outwardly to provide bases, and in separating the bowl portion centrally between the stem portions.

6. The herein described method of making from a glass tube an article having a bowl, stem and base, consisting in laterally enlarging the central portion of the tube to provide bowl and stem forming portions, in separating the stem portion from the bowl portion and at the same time forming a wall across the stem portion, in fusing the stem portion and the wall to the bowl portion, and in flanging the stem portion outwardly to provide a base.

In testimony whereof I hereunto affix my signature.

WILSON EARL KEE.